(12) United States Patent
Thakkar et al.

(10) Patent No.: US 12,106,243 B2
(45) Date of Patent: Oct. 1, 2024

(54) SYSTEM AND METHOD FOR AUTOMATED WORKLOAD IDENTIFICATION, WORKLOAD MODEL GENERATION AND DEPLOYMENT

(71) Applicant: Dell Products L.P., Round Rock, TX (US)

(72) Inventors: Bina K. Thakkar, Cary, NC (US); David C. Waser, Holly Springs, NC (US); Ashish Arvindbhai Pancholi, Cary, NC (US)

(73) Assignee: Dell Products L.P., Round Rock, TX (US)

(*) Notice: Subject to any disclaimer, the term of this patent is extended or adjusted under 35 U.S.C. 154(b) by 166 days.

(21) Appl. No.: 18/048,725

(22) Filed: Oct. 21, 2022

(65) Prior Publication Data

US 2024/0135287 A1 Apr. 25, 2024
US 2024/0232757 A9 Jul. 11, 2024

(51) Int. Cl.
*G06Q 10/0633* (2023.01)
(52) U.S. Cl.
CPC .............................. *G06Q 10/0633* (2013.01)
(58) Field of Classification Search
CPC .......................... G06Q 10/0633; H04L 41/145
See application file for complete search history.

(56) References Cited

U.S. PATENT DOCUMENTS

| | | | | |
|---|---|---|---|---|
| 2014/0244643 | A1* | 8/2014 | Basak | G06F 11/3414 707/737 |
| 2015/0324713 | A1* | 11/2015 | Haas | G06Q 10/067 705/7.27 |
| 2018/0336503 | A1* | 11/2018 | Kushida | G06Q 10/06313 |
| 2022/0121633 | A1* | 4/2022 | Quader | G06F 16/24545 |

\* cited by examiner

*Primary Examiner* — Caroline H Jahnige
(74) *Attorney, Agent, or Firm* — McDermott Will & Emery LLP

(57) ABSTRACT

A system for generating a workload model for a target information handling system includes gathering workload data from a plurality of information handling systems, dividing the workload data into a plurality of workload data bins, identifying workload data characteristics for each workload data bin and identifying workload data sets that may be applicable to the target information handling system. A workload mix may be determined based on the target information handling systems and workload data characteristics. Real customer workload data including real-time or near real-time workload data may be used to check a workload model for accuracy before deploying the workload model to a target information handling system.

20 Claims, 7 Drawing Sheets

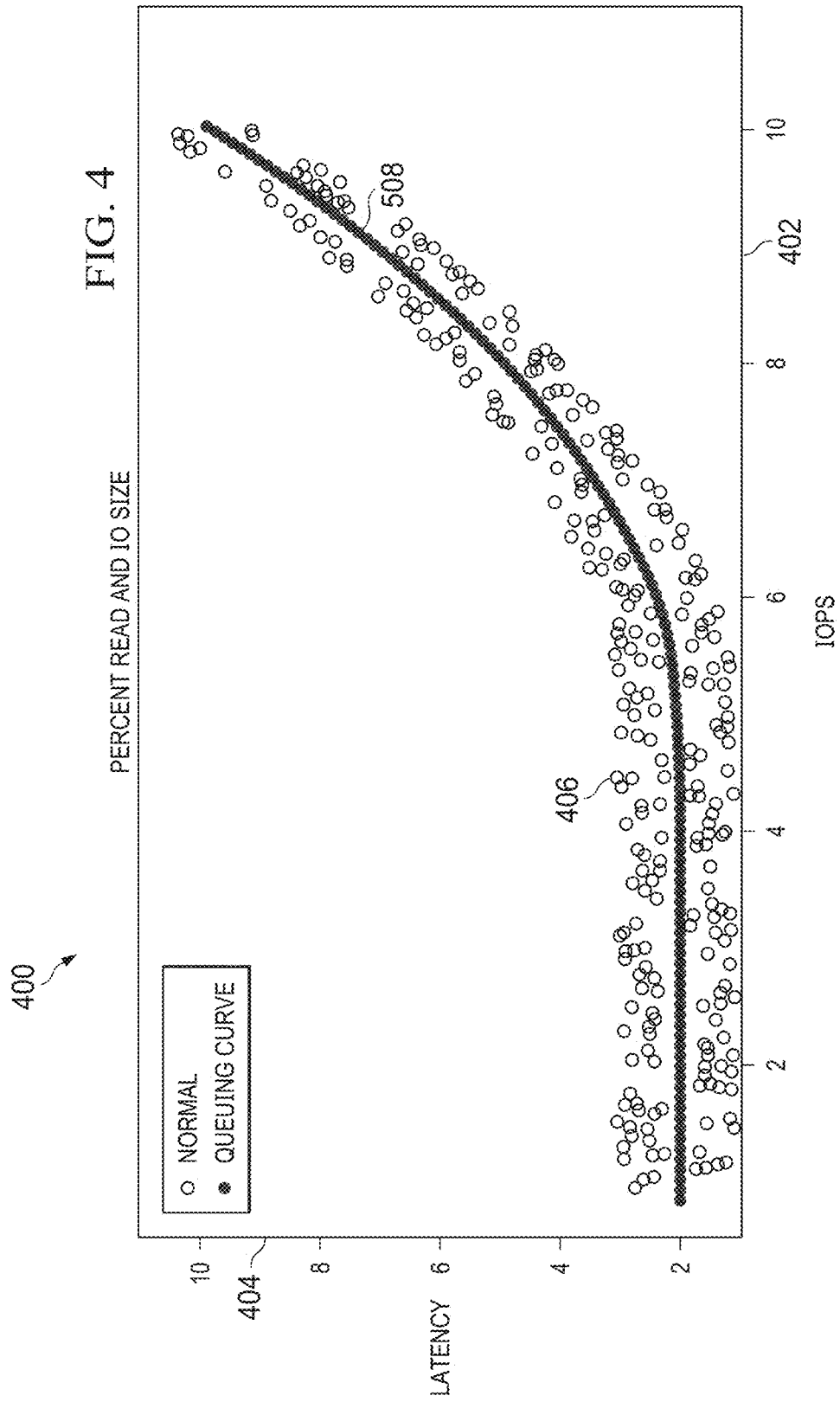

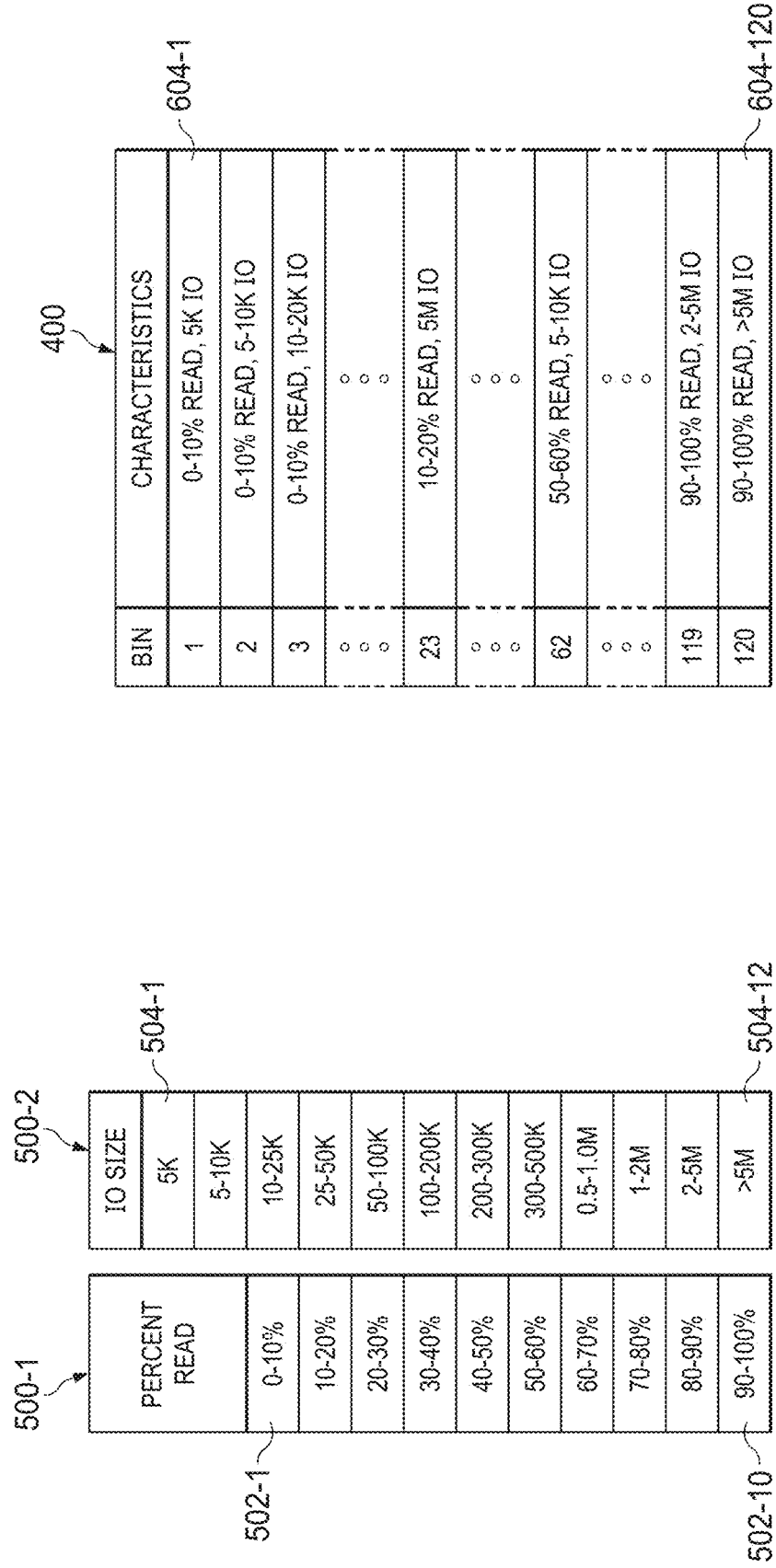

| | 704-1 | 704-2 | 704-3 | 706-1 | ... | 706-39 | 706-40 | 706-41 | 706-42 | ... | 706-119 | 706-120 |
|---|---|---|---|---|---|---|---|---|---|---|---|---|
| | CUSTOMER | INDUSTRY | SYSTEM | % READ 10-20% IO SIZE 5K | ... | % READ 30-40% IO SIZE 10-25K | % READ 40-50% IO SIZE 10-25K | % READ 50-60% IO SIZE 10-25K | % READ 60-70% IO SIZE 10-25K | ... | % READ 90-100% IO SIZE 2-5M | % READ 90-100% IO SIZE >5M |
| 702-1 | C1 | I1 | S1 | 1 | 1 | 0 | | 1 | | | | 0 |
| 702-2 | C1 | I1 | S2 | 0 | 0 | 0 | 1 | 1 | | 1 | 1 | 1 |
| | C2 | I2 | S3 | 1 | | 1 | | 1 | | | 1 | |
| 702-N | CN | IN | S4 | 1 | | 1 | | 1 | | | | 0 |

FIG. 7

SYSTEM AND METHOD FOR AUTOMATED WORKLOAD IDENTIFICATION, WORKLOAD MODEL GENERATION AND DEPLOYMENT

BACKGROUND

Field of the Disclosure

This disclosure relates generally to information handling systems and, more particularly, to methods for generating a workload model based on actual workload data.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems support a variety of workloads. Each of the different kinds of workloads puts different kinds of unique loads on the information handling system. For example, a networking information handling system in a cellular tower at a first location may have a different workload than a networking information handling system in a cellular tower at a second location, even if both cellular towers are operated by the same cellular service provider. In addition, information handling systems for different industries will have different kinds of workloads. For example, a storage information handling system for a financial company will have different workloads than a storage information handling system for a medical imaging company. Also, workloads are not static and may constantly change. It is challenging to be aware of different kind of workloads supported by information handling systems for the same or different customers in the same or different industries.

SUMMARY

Embodiments disclosed herein may identify emerging workloads from hundreds or thousands of user systems. Instead of analyzing a single array by hand to feed the data into a sizer, replaying workload data or searching for arrays of information handling systems configured for Network Attached Storage (NAS) workloads, for example, embodiments may leverage queuing theory and LSTM (long Short-Term Memory) networks and Machine Learning (ML) to identify emerging workloads from hundreds/thousands of user systems and generate a workload model. Embodiments may deploy the workload model internally for ensuring information handling systems can meet user needs or to a customer or potential customer to demonstrate an information handling system can meet their needs.

Embodiments may be generally directed to a method of generating a workload model for a target information handling system. The method may comprise receiving workload data corresponding to a plurality of information handling systems, dividing the workload data into a plurality of workload data bins based on at least one workload data characteristic of a plurality of workload data characteristics such that a workload data bin contains a portion of the workload data, clustering the portion of the workload data in each workload data bin of the plurality of workload data bins based on a set of workload data characteristics for the target information handling system, determining a workload mix based on the plurality of workload data bins and the set of workload data characteristics, and generating the workload model for the target information handling system using the workload mix.

In some embodiments, dividing the workload data into the plurality of workload data bins comprises executing an algorithm based on a queuing theory. In some embodiments, the method further comprises determining a set of block inputs and a set of file inputs for the workload data, wherein the workload model comprises the set of block inputs and the set of file inputs. In some embodiments, clustering comprises K-means clustering. In some embodiments, receiving the workload data comprises receiving the workload data for a period from a data repository, wherein the workload data comprises real-time or near-real time workload data. In some embodiments, the method further comprises deploying the workload model to the information handling system. In some embodiments, determining the set of workload data characteristics for the target information handling system comprises one or more of determining a set of workload data characteristics for an information handling system associated with a user system, determining a set of workload data characteristics for a plurality of user systems associated with an industry and determining a set of workload data characteristics for a plurality of information handling systems.

BRIEF DESCRIPTION OF THE DRAWINGS

For a more complete understanding of the invention and its features and advantages, reference is now made to the following description, taken in conjunction with the accompanying drawings, in which:

FIG. 4 is a graph illustrating a distribution of workload data for a sample workload data based on % READ and IO size characteristics;

FIG. 5 is a chart depicting a plurality of data structures containing workload data characteristics for dividing workload data into a plurality of workload data bins;

FIG. 6 is a chart depicting a plurality of workload information bins;

FIG. 7 is a data structure depicting values for various workload data characteristics for a plurality of workload data bins.

DESCRIPTION OF PARTICULAR EMBODIMENT(S)

Figure 1:
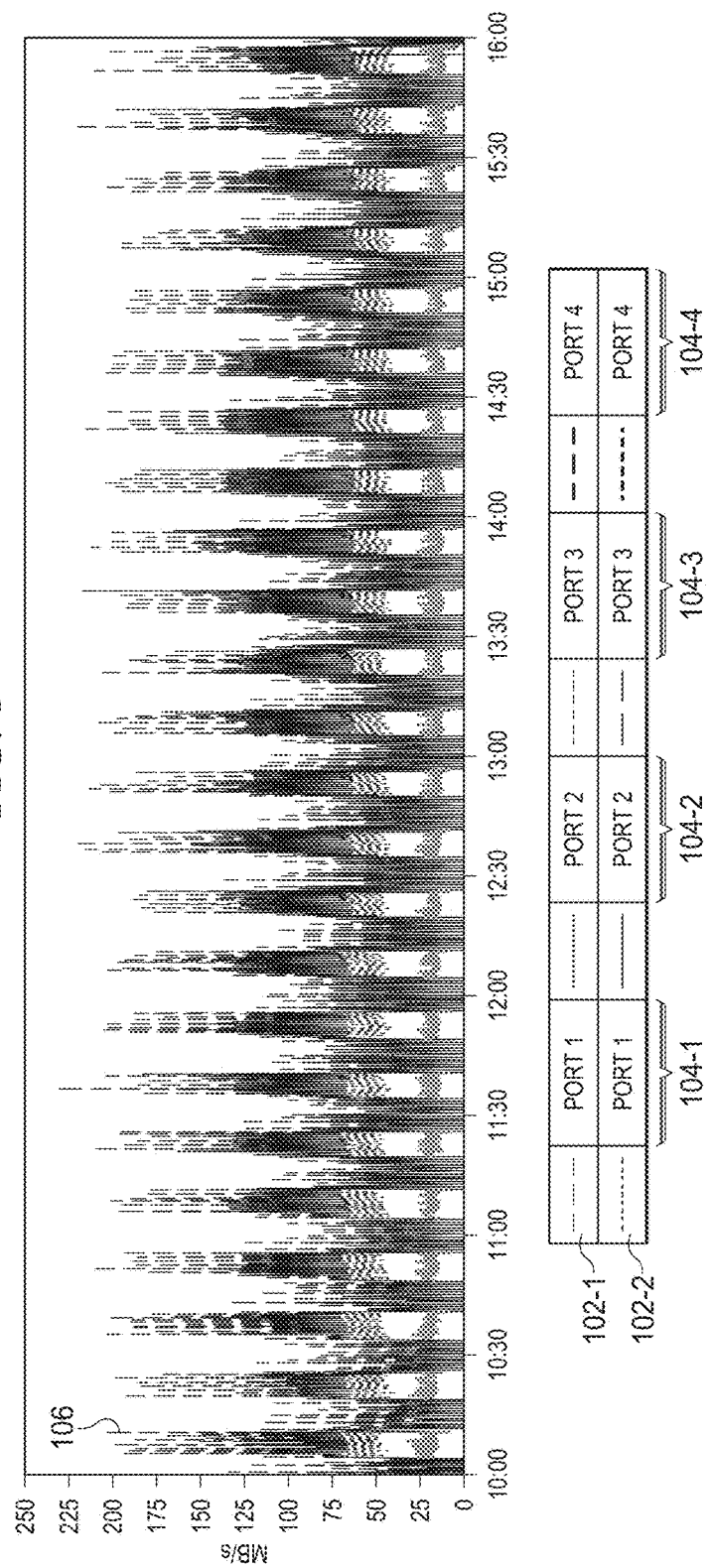
FIG. 1 is a sample histogram of networking operations at an information handling system, illustrating variations in workload for a user system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, component "204-1" refers to an instance of an application, which may be referred to collectively as components "204" and any one of which may be referred to generically as component "204."

As used herein, the term "workload data" may refer to data associated with processing, storage or networking operations for a single information handling system or multiple information handling systems in an array of information handling systems. Workload data may correspond to a single user system or multiple user systems. Workload data may be communicated from hundreds or thousands of user systems over a network and collected in a data repository and may include workload data for user systems in multiple industries. User system for various industries may have information handling systems for storage operations, processing operations, networking operations or some combination. For example, workload data may be collected from information handling systems used for networking operations by cellular providers (e.g., cellular provider industry), with each cellular provider having multiple cellular locations and multiple information handling systems at each cellular location.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and one or more video displays. The information handling system may also include one or more buses operable to transmit communication between the various hardware components.

Embodiments disclosed herein are described with respect to networking operations but may also be practiced with other operations. Particular embodiments are best understood by reference to FIGS. 1-8, wherein like numbers are used to indicate like and corresponding parts.

Turning to the drawings, FIG. 1 depicts a sample histogram 100 of workload data 106 for a user system in which the user system comprises two information handling systems 102, with each information handling system 102 comprising four ports 104 for processing information related to networking (e.g., networking operations) at a location (e.g., a cellular tower) for a user (e.g., a cellular service provider) in an industry (e.g., cellular service). As illustrated in FIG. 1, the workload data 106 may vary from less than 25 MB/s to over 225 MB/s. User systems for other cellular towers, other cellular service providers and for other industries may have different workloads and comprise fewer, more, or the same number of information handling systems 102.

Embodiments disclosed herein may analyze workload data received from a plurality of information handling systems and generate a workload model for a target information handling system. The workload model may be stored and/or deployed for various uses. For example, system designers may use a workload model to validate an information handling system design will meet manufacturing requirements, or an end user or third party may use the workload model to verify that an information handling system will meet end user requirements.

Figure 2:
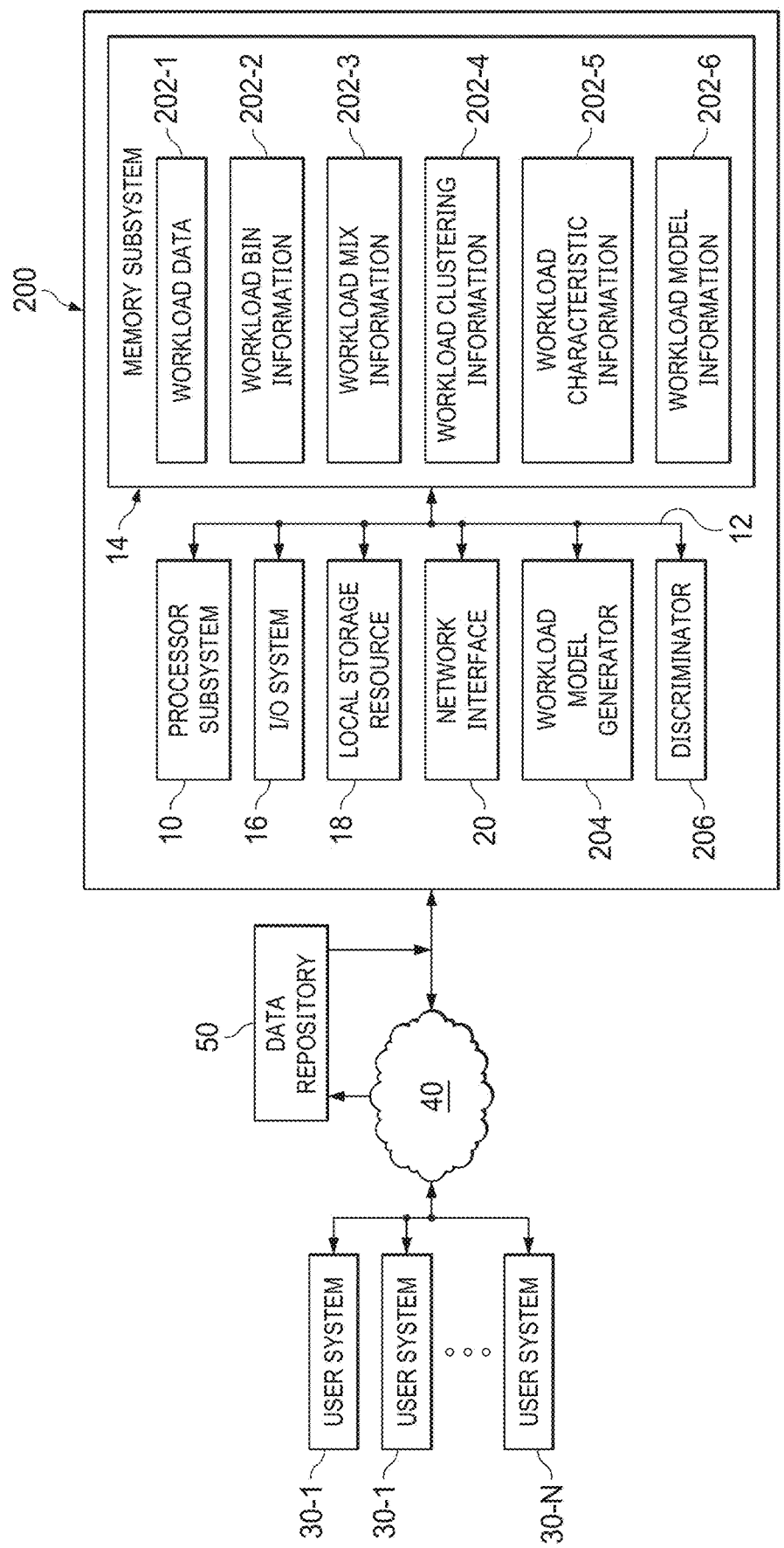
FIG. 2 is a schematic diagram of one embodiment of a system for identifying workload data and generating a workload model for a target information handling system.

FIG. 2 depicts one embodiment of a system for identifying workload data and generating a workload model for a target information handling system based on the workload data.

Information from a plurality of user systems 30 may be stored in data repository 50 or communicated to information handling system 200.

Components of information handling system 200 may include, but are not limited to, a processor subsystem 10, which may comprise one or more processors, and a system bus 12 that communicatively couples various system components to processor subsystem 10 including, for example, a memory subsystem 14, I/O subsystem 16, local storage resource 18, and network interface 20.

Processor subsystem 10 may comprise a system, device, or apparatus operable to interpret and execute program instructions and process data, and may include a microprocessor, microcontroller, digital signal processor (DSP), application specific integrated circuit (ASIC), or another digital or analog circuitry configured to interpret and execute program instructions and process data. In some embodiments, processor subsystem 10 may interpret and execute program instructions and process data stored locally (e.g., in memory subsystem 14). In the same or alternative embodiments, processor subsystem 10 may interpret and execute program instructions and process data stored remotely (e.g., in a network storage resource).

System bus 12 may refer to a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

Memory subsystem 14 may comprise a system, device, or apparatus operable to retain and retrieve program instructions and data for a period of time (e.g., computer-readable media). Memory subsystem 14 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as system 200, is powered down. Memory subsystem 14 may include workload data storage 202-1 for storing workload data received from user systems 30 either directly over network 40 or via data repository 50, workload bin information storage 202-2 for storing workload bin information, workload mix information storage 202-3 for storing workload mix information, workload clustering information storage 202-4 for storing workload clustering information, workload characteristic information storage 202-5 for storing workload characteristic information and workload model storage 202-6 for workload model information, discussed in greater detail below. Memory subsystem 14 may store workload model generator 204 and discriminator 206, discussed in greater detail below.

In information handling system 200, I/O subsystem 16 may comprise a system, device, or apparatus generally operable to receive and transmit data to or from or within information handling system 200. I/O subsystem 16 may represent, for example, a variety of communication interfaces, graphics interfaces, video interfaces, user input interfaces, and peripheral interfaces. In various embodiments, I/O subsystem 16 may be used to support various peripheral devices, such as a touch panel, a display adapter, a keyboard, a touch pad, or a camera, among other examples. In some implementations, I/O subsystem 16 may support so-called 'plug and play' connectivity to external devices, in which the external devices may be added or removed while information handling system 200 is operating.

Local storage resource 18 may comprise computer-readable media (e.g., hard disk drive, floppy disk drive, CD-ROM, and other type of rotating storage media, flash memory, EEPROM, or another type of solid-state storage media) and may be generally operable to store instructions and data.

Network interface 20 may be a suitable system, apparatus, or device operable to serve as an interface between information handling system 200 and a network (not shown). Network interface 20 may enable information handling system 200 to communicate over a network using a suitable transmission protocol or standard. In some embodiments, network interface 20 may be communicatively coupled via a network to a network storage resource (not shown). A network coupled to network interface 20 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). A network coupled to network interface 20 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. A network coupled to network interface 20 or various components associated therewith may be implemented using hardware, software, or any combination thereof.

Information handling system 200 may receive workload data from a plurality of user systems 30 and develop a workload model based on the workload data.

Figure 3:
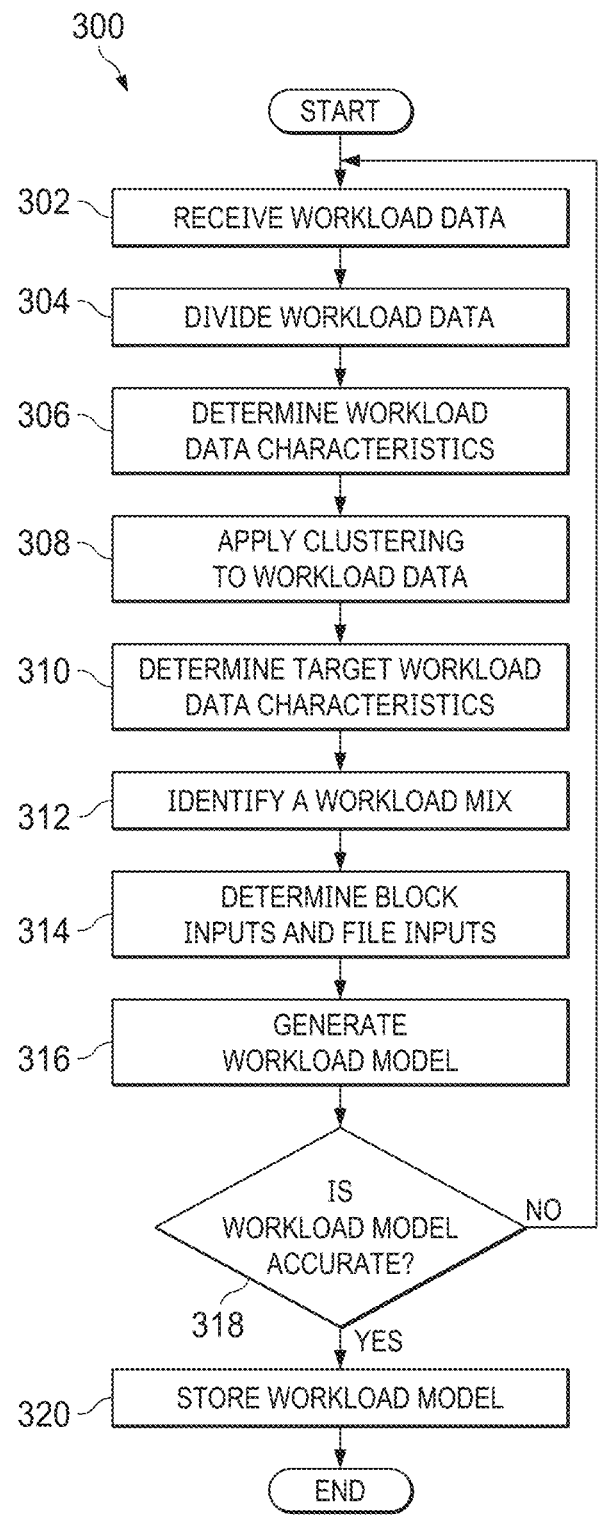
FIG. 3 is a flow diagram illustrating a method for determining a workload model.

FIG. 3 depicts a flow diagram 300, illustrating a method for generating a workload model.

The method may begin at step 302 with information handling system 200 receiving workload data from a plurality of user systems 30. Workload data may be provided in real-time or near real-time. Each user system 30 may include a single stand-alone information handling system 102, correspond to an array of information handling systems 102 associated with an end user (e.g., a customer), correspond to a plurality of information handling systems 102 associated with an industry, or some other set of information handling systems 102.

At step 304, information handling system 200 may store the workload data in workload data storage 202-1 and divide the workload data into a plurality of workload data bins. For example, information handling system 200 may use workload characteristics such as % READ and IO (input/output) size for dividing workload data from hundreds or thousands of information handling systems 102 into workload data 120.

FIG. 4 depicts graph 400 illustrating a plurality of workload data points 406 stored in workload data storage 202-1, wherein each workload data point 406 may be plotted against queuing curve 408 determined for a workload characteristic (e.g., 50-60% READ operations). In some embodiments, information handling system 200 may execute an algorithm based on queuing theory to divide the workload data stored in workload data storage 202-1 into a plurality of workload data bins. Using the algorithm, latency 404 may be determined for workload data points 406 having different values for a second workload characteristic (e.g., IOPS (inputs/outputs per second), which may be a way to further divide workload data into workload data sets.

FIG. 5 depicts example data structures 500-1 and 500-2 containing workload characteristics (e.g., % READ and IO size) for determining how to divide the workload data points 406 stored in workload data storage 202-1 into the workload data bins. Data structure 500-1 contains ten rows 502-1 to 502-10 for characterizing the workload data based on % READ operations. Data structure 500-2 contains twelve rows 504-1 to 504-12 for characterizing the workload data based on IO size (e.g., the number of IO operations). Using this example, information handling system 200 may allocate memory in workload bin information storage 202-2 based on the number of combinations of workload characteristics (e.g., 10×12=120 workload data bins).

Still referring to method 300 and FIG. 5, FIG. 6 depicts a portion of a sample data structure 600 for storing workload information for each workload data set determined in FIG. 5. As depicted in FIG. 6, data structure 600 may contain 120 rows based on data structure 500-1 having ten rows and data structure 500-2 having twelve rows. As an example, row 604-1 contains workload data information for a workload data bin in which each workload data point 406 corresponds to 0-10% READ operations and up to 5K IO size. Data structure 600 may be stored in workload bin information storage 202-2.

At step 306, information handling system 200 may analyze all or a portion of the workload data stored in workload data storage 202-1 or workload bin information storage 202-2 to identify workload data characteristics for a single information handling system 102, workload data characteristics for all information handling systems 102 associated with a single user 30, workload data characteristics for all information handling systems 102 associated with an industry or workload data characteristics for all information handling systems 102 associated with all users, for example.

At step 308, information handling system 200 may apply clustering to the workload data in the plurality of workload data bins or a portion of the workload data based on a user system 30 being a single information handling system 102 or multiple information handling systems 102, an industry, or some other criteria. In some embodiments, clustering comprises K-means clustering.

At step 310, information handling system 200 may analyze the workload data in each workload data bin to determine a set of workload characteristics for that workload data bin. For example, information handling system 200 may analyze the workload data for a workload data bin corresponding to each row 604 to determine an operations type (e.g., a read operation, a write operation or an append operation type), an IO pattern (e.g., sequential or random), a file system type (e.g., a tree depth, a tree width, the number of files per folder, etc.) and determine if the workload data comprises only data or includes metadata. Information handling system 200 may apply clustering to identify workload data sets that may apply to information handling systems 102 based on a user system 30, an industry, or some other criteria. In some embodiments, information handling system 200 applies K-means clustering to identify workload data sets that may apply to information handling systems 102 based on a user system 30, an industry, or some other criteria.

FIG. 7 depicts data structure 700 containing workload data characteristics for user systems 30 for a period (e.g., 24 hours, last 30 days, etc.), wherein columns 704 contain user information (e.g., column 704-1 identifies user systems C1-CN for different user systems, column 704-2 identifies industries I1, I2 . . . IN, and column 704-3 identifies information handling systems S1, S2 . . . SN). Columns 706 may correspond to rows 604 in data structure 600. For example, row 702-1 may correspond to a first information handling system 102 associated with a first end user (e.g., customer value "C1" may refer to a first customer C1) in a first industry (e.g., industry value "I1" may correspond to healthcare, industry value "I2" may correspond to shipping, etc.) and column 704-3 may contain system information (e.g., system value "S1" may correspond to an information handling system 102 for networking system, system value "S2" may correspond to an information handling system 102 for a storage system, etc.).

In some embodiments, a cell in data structure 700 may have a value indicating there are a substantial number of workload data points 406 in a workload data bin corresponding to a cell in a row 604 in FIG. 6. For example, referring to row 702-1, a cell corresponding to column 706-1 may include a value of "1" to indicate that, for system S1 associated with Customer C1 in industry I1, there is a substantial number of workload data points 406 corresponding to a cell in a row 604 in FIG. 6 having a combination of 10-20% READ operations and less than 5K IO size. Still referring to row 702-1, a cell corresponding to column 706-39 may include a value of "0" to indicate that, for system S1 associated with Customer C1 in industry I1, there is not a substantial number of workload data points 406 corresponding to a cell in a row 604 in FIG. 6 having a combination of 30-40% READ operations and an IO size between 10 to 25K (10,000 to 25,000).

In some embodiments, if there are less than a threshold number of workload data points 406 corresponding to a cell in a row 604 in FIG. 6, some embodiments may not include a value in a corresponding cell in data structure 700. For example, still referring to row 702-1, a cell corresponding to column 706-42 may not include a value to indicate that, for system S1 associated with Customer C1 in industry I1, the number of workload data points 406 in a cell in a row 604 in FIG. 6 having a combination of 60-70% READ operations and between 10-25K I0 size is below a threshold number.

Still referring to method 300, at step 312, information handling system 200 may identify a workload mix comprising a set of workload processes, discussed in greater detail below.

At step 314, embodiments may determine block inputs and file inputs.

Block inputs may include, for example, % READ, IO size, a number of threads, and a pattern. A % READ block input may have a type (e.g., workload mix) and a value (e.g., 50%). An IO size block input may have a type (e.g., workload mix) and a value (e.g., 4K, 8K, etc.). A number of threads block input may have a type (e.g., numerical) and a value (e.g., 1-100). A pattern block input may have a type (e.g., binary) and indicate a pattern (e.g., random/sequential).

File inputs (also referred to as FileSystem or FS inputs) may include, for example, a % READ file input, an IO size file input, an operation file input, a data/metadata file input, a protocol file input, and a pattern file input. A % READ file input may have a type (e.g., workload mix) and a percentage of READ operations (e.g., 50%). An IO size file input may have a type (e.g., workload mix) and a value (e.g., 4K, 8K, etc.). An operation file input may have a type (e.g., categorical) and include an operation (e.g., READ, WRITE, APPEND). A data/metadata file input may have a type (e.g., categorical) and a value (e.g., headers, get attributes, set attributes, etc.). A protocol file input may have a type (e.g., binary) and an indicator (e.g., CIFS (Common Internet File System) or NFS (Network File System)). A pattern file input may have a type (e.g., binary) and indicate a pattern (e.g., random/sequential).

At step 316, information handling system 200 may generate a workload model based on the workload mix and the workload characteristics, discussed in greater detail below.

At step 318, embodiments determine if the workload model is accurate, discussed in greater detail below.

If the workload model is accurate, embodiments may store the workload model and indicate the workload is available to deploy at step 320.

If the workload model is not accurate, one or more of steps 304-314 may be repeated to generate a new workload model at step 316 and the new workload model is checked for accuracy.

Determining a Workload Mix

In some embodiments, information handling system 200 may determine a workload mix for a user system. For example, information handling system 200 may determine that all information handling systems have a % READ workload characteristic that is at least 50% READ operations, all information handling systems for all cellular service providers have a % READ workload characteristic that is at least 70% READ operations and further determine a % READ workload characteristic for information handling systems for a particular cellular service provider may be at least 80% READ operations. Thus, a workload mix for a target information handling system (e.g., S1) for any user system 30 may be at least 50% READ operations, a workload mix for a target information handling system (e.g., S1) for any user system 30 in the cellular service industry (e.g., I1) may comprise at least 70% READ operations but a workload mix for a target information handling system (e.g., S1) for a particular user system (e.g., C1) may comprise at least 80% READ operations.

Figure 8:
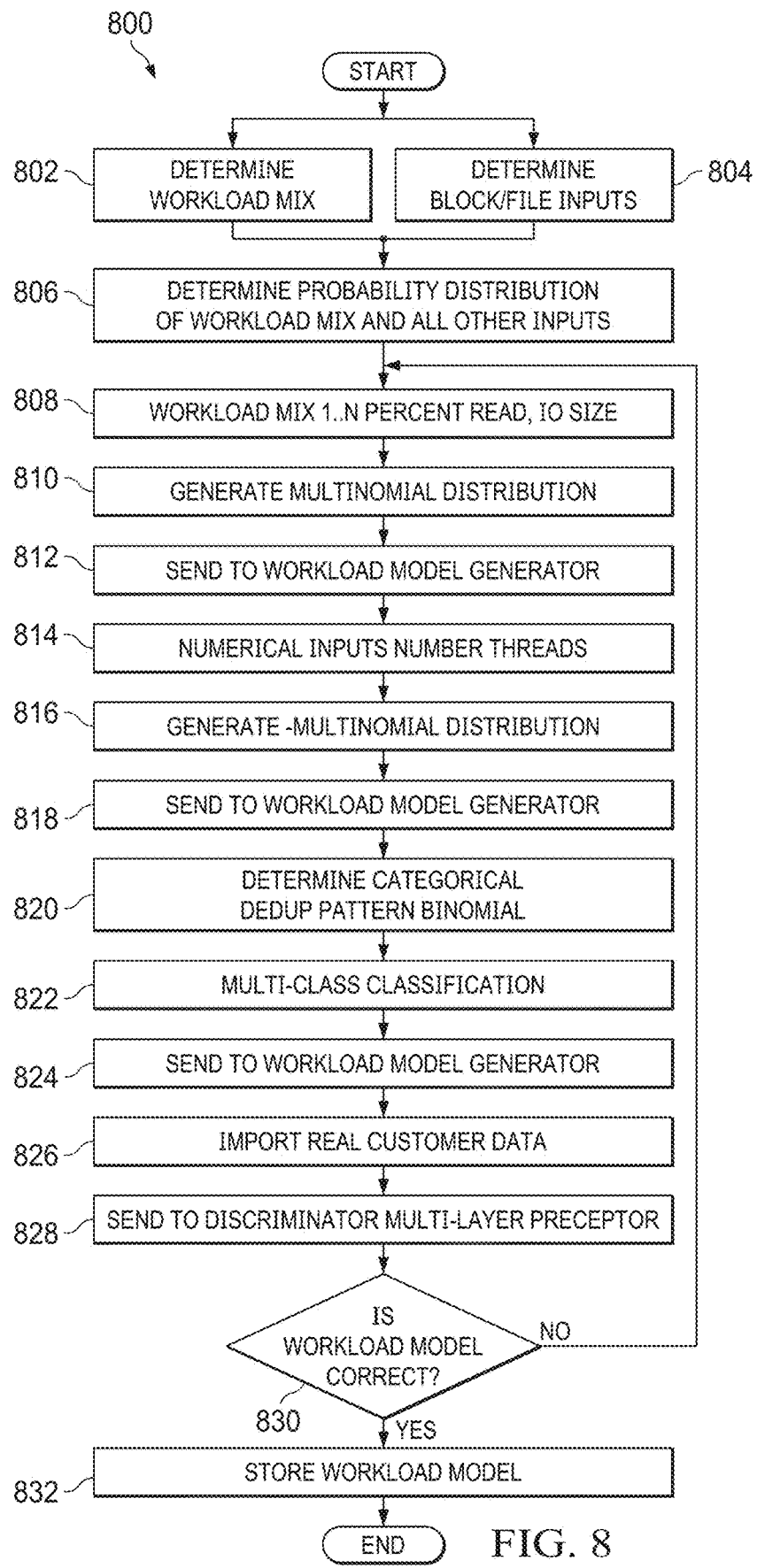
FIG. 8 is a flow diagram illustrating a method for generating a workload model with a workload mix.

FIG. 8 depicts a flow diagram 800, illustrating a method for generating a workload model from a plurality of workload mixes.

At step 802, embodiments may use data structure 700 to determine a workload mix for a workload model for a target information handling system, wherein the workload mix may be based on cells in columns 706 and the target information handling system. For example, a workload mix for a target information handling may be based on networking operations, wherein networking information handling systems may be associated with more than 60% READ operations and an average IO size between 100-200K but need to process workloads that range from 0-100% READ operations with IO sizes in a range of <5K IOPS up to >5M IOPS. A workload data mix may be based on a period (e.g., 1 hour, 7 days, etc.). Using cells in data structure 700, embodiments may determine an initial workload mix should include workload with 10-20% READ operations and less than 5K IO size and 40-50% and 50-60% READ operations with IO size 10-25K but not include workload with 30-40% READ operations with IO size between 10-25K.

At step 804, embodiments may determine a set of block inputs and file inputs for the workload mix. Block inputs may include information such as workload data that is transferred in blocks from a file with no conversion and may not have formatting. File inputs may refer to inputs associated with data. For example, a file input may include an operations type, such as a READ operation, a WRITE operation or an APPEND operation, may include data and/or metadata, may identify an IO pattern, such as sequential or random, or may include a file system structure, such as a tree depth, a tree width, or a number of files per folder, for example. The block and file inputs may affect how much processing is required. For example, a READ operation may include a file input that specifies a path. A READ operation for a first user system 30 may have a complex file path that requires more processing steps and a READ operation for a second user system 30 may have a simpler file path that requires fewer processing steps.

At step 806, embodiments may calculate a probability distribution for the workload mix including other inputs such as the block inputs and the file inputs. Referring back to FIG. 7, for a target information handling system for user C1 in industry I1, embodiments may determine that there is a higher probability that an information handling system used by customer C1 will process workload data having a % READ of 50-60% and an IO size of 10-25K and a lower probability that an information handling system used by customer C1 will process workload data having a % READ of 40-50% and an IO size of 10-25K. No values in column 706-42 indicate there might not be enough workload data points 406 to determine a probability that an information handling system used by customer C1 will process workload data having a % READ of 60-70% and an IO size of 10-25K.

At step 808, embodiments may determine a workload mix based on rows 702 in data structure 700 and the probability distribution of the workload mix. Continuing the example, information handling system 200 may determine a workload mix for a workload model for a target information handling system should include more workload data having a % READ of 50-60% and an IO size of 10-25K and less workload data having a % READ of 40-50% and an IO size between 10-25K.

At step 810, embodiments may generate a multinomial distribution on the workload mix. In some embodiments, information handling system 200 may generate a multinomial distribution to account for some cells in data structure 700 not having any values.

At step 812, embodiments may send the workload mix and the multinomial distribution to workload model generator 204. In some embodiments, workload model generator 204 may generate a workload model based on the workload data received from all information handling systems 102 and store the workload model in model information storage 202-6. However, variations in workload data associated with different user systems and industries means a generic workload model might be accurate to identify trends in workload data for developing a basic information handling system 102, but an information handling system 102 in a particular industry or used by a particular user or in a particular user system 30 might not be adequate. In some embodiments, workload model generator 204 uses a Long Short-Term Memory (LSTM) network and machine learning (ML) to refine workload models.

At step 814, embodiments may generate a set of numerical inputs for the workload mix. generate each numerical input. In some embodiments, workload model generator 204 may use LSTM and ML to learn order dependence and predict sequences for a particular industry or a particular user or a particular information handling system 102.

At step 816, embodiments may generate a multinomial distribution on the workload mix based on the set of numerical inputs.

At step 818, embodiments may send the workload mix and the multinomial distribution based on the numerical inputs to workload model generator 204. In some embodiments, workload model generator 204 uses a Long Short-Term Memory (LSTM) network and machine learning (ML) to refine workload models based on the multinomial distribution and the set of numerical inputs.

At step 820, embodiments may determine a categorical dedup pattern binomial for the workload model. Large workload data sets can have patterns. To avoid the workload model from having overly redundant workload data sets taking up large amounts of memory, embodiments may determine if there are patterns and determine a dedup pattern binomial.

At step 822, embodiments may generate a multi-class classification on the workload mix based on the categorical dedup pattern binomial.

At step 824, embodiments may send the workload mix to workload model generator 204. Workload model generator 204 may generate a workload model for a target information handling system based on the workload mix, the multinomial distribution, the set of numerical inputs for the workload mix, the categorical dedup pattern binomial for the workload model and the multi-class classification on the workload mix based on the categorical dedup pattern binomial.

At step 826, embodiments may import user workload data to workload model generator 204. In some embodiments, if the workload mix is based on a period (e.g., 30 days), user workload data for a period (e.g., 30 days) may be imported. User workload data may be actual data imported in real-time or near real-time.

At step 828, embodiments may send the workload model with the imported customer data to discriminator 206. Discriminator 206 may comprise a multi-layer preceptor for comparing real and generated workload data to ensure the workload data is accurate.

At step 830, embodiments may determine if the workload model is accurate. In some embodiments, determining if the workload model is accurate may involve discriminator 206 determining if a target information handling system can process the imported data according to the workload data mix. In some embodiments, determining if the workload model is accurate may involve discriminator 206 determining if the workload model is accurate for multiple workloads. In some embodiments, determining if the workload model is accurate may involve discriminator 206 determining if the workload model is accurate for multiple information handling systems 102 associated with a user system 30. For example, a user system 30 may include information handling systems 102 for networking and storage systems, wherein determining if the workload model is accurate may involve discriminator 206 determining if the workload model is accurate for a networking information handling system 102 and/or storage information handling systems 102.

If the workload model is not accurate, embodiments may repeat any of steps 808-828 until the workload model is accurate. In some embodiments, if the workload model is not accurate, changes may be implemented to one or more of the workload data characteristics or workload bin information. For example, a period may be increased to collect more workload data points 406 or may be decreased to collect more recent workload data points 406, or the division between workload data bins may be increased (e.g., increase the number of rows 502 or 504 in data structures 500) for more granularity or decreased (e.g., decrease the number of rows 502 or 504 in data structures 500) to include more workload data points 406 in each workload data bin.

If the workload model is accurate, then at step 832, embodiments may store the workload model and indicate the workload model is ready to deploy. The workload model may be stored in workload model information storage 202-6 for using as a basis for generating workload models for other information handling systems 102, including an information handling system 102 that is part of a user system 30, or for other information handling system 102 for the same user system 30 or the same industry. Embodiments may use machine learning to compare newer workload models with workload models stored in workload model information storage 202-6 to identify trends in workload data and refine future workload models for greater accuracy. In some embodiments, when an information handling system 102 is being designed or manufactured, information handling system 200 may determine a user system, a user (e.g., a customer or potential customer) or an industry associated with information handling system 102 and deploy a workload model to information handling system 102 over a network or to an information handling system (not shown) associated with manufacturing or validating information handling system 102, wherein the information handling system 102 being manufactured or validated may need to process the workload model to be validated. In some embodiments, when information handling system 102 is delivered to a user and connected to a network, information handling system 200 may deploy a workload model (which could be the same workload model used to validate information handling system 102 or a different workload model) to the user system so the user can verify information handling system 102 meets their needs. In some embodiments, when a workload model is deployed, information handling system 200 may provide real-time workload data or near real-time workload data retrieved from data repository 50 or may provide workload data stored in workload data storage 202-1.

The above disclosed subject matter is to be considered illustrative, and not restrictive, and the appended claims are intended to cover all such modifications, enhancements, and other embodiments which fall within the true spirit and scope of the disclosure. Thus, to the maximum extent allowed by law, the scope of the disclosure is to be determined by the broadest permissible interpretation of the following claims and their equivalents, and shall not be restricted or limited by the foregoing detailed description.

The invention claimed is:

1. A method of generating a workload model for a target information handling system, the method comprising:
   receiving workload data corresponding to a plurality of information handling systems;
   dividing the workload data into a plurality of workload data bins based on at least one workload data characteristic of a plurality of workload data characteristics, each workload data bin containing a portion of the workload data;
   clustering the portion of the workload data in each workload data bin of the plurality of workload data bins based on a set of workload data characteristics for the target information handling system;
   determining a workload mix based on the plurality of workload data bins and the set of workload data characteristics; and
   generating the workload model for the target information handling system using the workload mix.

2. The method of claim 1, wherein dividing the workload data into the plurality of workload data bins comprises executing an algorithm based on a queuing theory.

3. The method of claim 1, further comprising determining a set of block inputs and a set of file inputs for the workload data, wherein the workload model comprises the set of block inputs and the set of file inputs.

4. The method of claim 1, wherein clustering comprises K-means clustering.

5. The method of claim 1, wherein receiving the workload data comprises receiving the workload data for a period from a data repository.

6. The method of claim 1, further comprising deploying the workload model to the information handling system, wherein the workload data comprises real-time or near-real time workload data.

7. The method of claim 1, wherein determining the set of workload data characteristics for the target information handling system comprises one or more of determining a set of workload data characteristics for an information handling system associated with a user system, determining a set of workload data characteristics for a plurality of user systems associated with an industry and determining a set of workload data characteristics for a plurality of information handling systems.

8. A system for generating a workload model for a target information handling system, the system comprising:
   an information handling system configured to:
      receive workload data corresponding to a plurality of user information handling systems;
      divide the workload data into a plurality of workload data bins based on at least one workload data characteristic of a plurality of workload data characteristics, each workload data bin containing a portion of the workload data;

cluster the portion of the workload data in each workload data bin of the plurality of workload data bins based on a set of workload data characteristics for the target information handling system;
determine a workload mix based on the plurality of workload data bins and the set of workload data characteristics; and
generate the workload model for the target information handling system using the workload mix.

9. The system of claim 8, wherein the information handling system is configured to execute an algorithm based on queuing theory to divide the workload data into the plurality of workload data bins.

10. The system of claim 8, wherein the information handling system is configured to determine a set of block inputs and a set of file inputs for the workload data, wherein the workload model comprises the set of block inputs and the set of file inputs.

11. The system of claim 8, wherein the information handling system is configured to cluster the workload data based on K-means clustering.

12. The system of claim 8, wherein the system further comprises a data repository,
wherein the information handling system is configured to receive the workload data from the data repository, and wherein the workload data corresponds to a time period.

13. The system of claim 12, wherein the information handling system is configured to communicate with the data repository to receive real-time or near-real time workload data and deploy the workload model to the target information handling system.

14. The system of claim 8, wherein the information handling system is configured to determine one or more of a set of workload data characteristics for an information handling system associated with a user system, a set of workload data characteristics for a plurality of user systems associated with an industry and a set of workload data characteristics for a plurality of information handling systems.

15. An information handling system for generating a workload model for a target information handling system, the information handling system comprising:

a memory device configured to:
store workload data corresponding to a plurality of user information handling systems; and
a processor configured to execute instructions to:
divide the stored workload data into a plurality of workload data bins based on at least one workload data characteristic of a plurality of workload data characteristics, each workload data bin containing a portion of the workload data;
cluster the portion of the workload data in each workload data bin of the plurality of workload data bins based on a set of workload data characteristics for the target information handling system;
determine a workload mix based on the plurality of workload data bins and the set of workload data characteristics; and
generate the workload model for the target information handling system using the workload mix.

16. The information handling system of claim 15, wherein the information handling system is configured to execute an algorithm based on queuing theory to divide the workload data into the plurality of workload data bins.

17. The information handling system of claim 15, wherein the information handling system is configured to determine a set of block inputs and a set of file inputs for the workload data, wherein the workload model comprises the set of block inputs and the set of file inputs.

18. The information handling system of claim 15, wherein the information handling system is configured to cluster the workload data based on K-means clustering.

19. The information handling system of claim 15, wherein the information handling system is configured to receive the workload data from a data repository, wherein the workload data corresponds to a period.

20. The information handling system of claim 19, further configured to:
communicate with the data repository to receive real-time or near-real time workload data; and
deploy the workload model to the target information handling system.

* * * * *